Henry O. Lothrop's
Impt in Heel and Toe Irons.
73451
PATENTED
JAN 21 1868
Witnesses.
C. W. Baldwin
S. C. Jones.
Henry O. Lothrop
by his Attorney.
Frederick Curtis.

United States Patent Office.

HENRY O. LOTHROP, OF MILFORD, MASSACHUSETTS, ASSIGNOR TO HIMSELF CRAWFORD PIERCE AND JOSEPH R. PIERCE, OF SAME PLACE.

Letters Patent No. 73,451, dated January 21, 1868.

IMPROVEMENT IN COATING HEEL AND TOE-IRONS FOR BOOTS AND SHOES.

The Schedule referred to in these Letters Patent and making part of the same.

TO ALL TO WHOM THESE PRESENTS SHALL COME:

Be it known that I, HENRY O. LOTHROP, of Milford, in the county of Worcester, and State of Massachusetts, have invented a new and useful Improvement in the Manufacture of "Heel and Toe-Irons," for Boots and Shoes; and do hereby declare the following to be a full, clear, and exact description of the same, reference being had to the accompanying drawing, which exhibits a section of a "heel-iron," treated in accordance with my invention.

The manufacture of "heel and toe-irons," for protecting the heels and toes of boots and shoes, has become a very extensive branch of the boot and shoe business of the New England States, as well as of many others, and large quantities, in addition to the domestic consumption, are now sent to California, and other remoter points on the American continent, as well as exported to foreign countries.

Heretofore a very great objection to transporting them by sea has been found to exist in the fact they become much rusted or corroded, and in many cases entirely destroyed.

The object of my present invention is to counteract or prevent this possibility of corrosion, and consists in applying an anti-corrosive coating to the "irons," or one which will resist any injurious action upon them. The most suitable coating for this purpose, and which I have adopted, is one of tin, although several other materials may be employed.

The accompanying drawing represents the body of the heel-iron at $a$, and its anti-corrosive coating at $b$.

I claim, as a new article of manufacture, a heel or toe-iron, coated with tin or other anti-corrosive metal, substantially as and for the purposes herein shown and set forth.

HENRY O. LOTHROP.

Witnesses:
FREDERICK CURTIS,
E. C. GRIFFITH.